United States Patent [19]

McGauley et al.

[11] 4,055,631
[45] Oct. 25, 1977

[54] PRODUCTION OF IRON SULFATE MONOHYDRATE

[75] Inventors: Patrick J. McGauley, Port Washington, N.Y.; Abraham A. Dor, Lakewood, Ohio

[73] Assignee: The Hanna Mining Company, Cleveland, Ohio

[21] Appl. No.: 640,939

[22] Filed: Dec. 15, 1975

Related U.S. Application Data

[60] Continuation of Ser. No. 410,217, Oct. 26, 1973, abandoned, which is a division of Ser. No. 113,553, April 13, 1971, Pat. No. 3,860,696.

[51] Int. Cl.$^2$ ............................................. C01G 49/14
[52] U.S. Cl. ................................... 423/558; 423/141;
23/305 F; 156/DIG. 74
[58] Field of Search ............... 423/558, 141; 23/305 F

[56] References Cited

U.S. PATENT DOCUMENTS

| 2,143,805 | 1/1939 | Smith | 423/558 |
| 3,860,696 | 1/1975 | McGauley et al. | 423/558 |

FOREIGN PATENT DOCUMENTS

| 614,186 | 2/1961 | Canada | 423/558 |
| 39-27305 | 1964 | Japan | 423/558 |
| 1,093,162 | 11/1967 | United Kingdom | 423/558 |

Primary Examiner—Edward Stern
Attorney, Agent, or Firm—Donnelly, Maky, Renner & Otto

[57] ABSTRACT

A process for the production of high purity iron sulfate monohydrate from an iron sulfide mineral feed involving a leaching, purification, crystallization and dehydration procedure to recover a solution of iron sulfate containing iron sulfate polyhydrates and to convert iron sulfate polyhydrates in a series of steps to monohydrate crystals. The process can be also advantageously used with iron sulfide feed materials containing non-ferrous metals with full separation and recovery of the non-ferrous metals in the sulfide residue of the leaching and purification process of this invention. It can also be used for the purification of industrial pickle liquor solutions which can be treated with the iron sulfide mineral feed in this process leach circuit with full recovery of the ferrous and non-ferrous metals content of these solutions.

6 Claims, 5 Drawing Figures

PRODUCTION OF IRON SULFATE MONOHYDRATE

This is a continuation of application Ser. No. 410,217, filed Oct. 26, 1973, now abandoned, which was a division of application Ser. No. 113,553, filed Apr. 13, 1971, now U.S. Pat. No. 3,860,696.

BACKGROUND OF THE INVENTION

This invention relates to the production of a high purity iron sulfate monohydrate and a separate concentrated sulfide residue containing valuable metals from complex sulfide ores and concentrates containing iron sulfide minerals and non-ferrous metals of significant value.

It is particularly suited to the treatment of iron sulfide ores containing base metal sulfides which because of their complex mineralogy or relatively fine grain size distribution do not lend themselves to economic processing by conventional methods of separation and beneficiation for the selective recovery of the valuable metals they contain.

It has, furthermore, the important advantage of recovering a substantial part of the iron sulfides sulfur in the form of hydrogen sulfide. Thus it lends itself to the adoption of pollution free flow-sheets for the complete separation and recovery of all of the valuable constituents of the sulfide ores or concentrates, including both iron and base metals while all of the sulfur can be recovered as elemental sulfur, which is the form under which it can be marketed most easily.

Prior art processes for the production of iron sulfate, generally have used available supplies of industrial wastes such as the acidic effluent from coal, steel, and pigment production, as feed materials, and generally have operated primarily as waste disposal processes. Most of these processes are not capable of extracting iron from iron bearing sulfide minerals.

Essentially, in all of them, non-ferrous impurities remain with the iron products recovered, thus adversely affecting their quality and reducing their value for use in the production of steel. Furthermore, these processes tend to consume excessive quantities of fuel to dehydrate the iron sulfate. This results in prohibitive costs for the products obtained, which cannot be marketed profitably. Under present conditions, the use of these processes would result in commercial losses and would only be justified on the basis of waste disposal considerations.

The prior art process of U.S. Pat. No. 3,053,651 is capable of extracting and recovering iron both from iron bearing sulfide minerals, and from waste liquors containing iron sulfate and sulfuric acid. This process also provides for purification of the solution, and the iron sulfate product. However, partially soluble sulfides of metals like zinc and/or nickel frequently are present in available feed materials, and this patent does not disclose any process for the removal of such metals from the iron sulfate solution. When present, these base metal impurities would accumulate in iron sulfate crystals, if not removed, and would generally render the iron sulfate products unacceptable as a source of iron oxide for use in the production of steel.

The above process, in common with other prior processes for the production of iron sulfate, discloses the use of commercial fuel as the source of heat to separate the water from the iron sulfate. This would require excessive quantities of fuel because of the large amounts of water to be removed, resulting in excessive operating costs.

SUMMARY OF INVENTION

The process of this invention provides a novel crystallization procedure that has many advantages including:

a. The ability to use a minimum amount of water throughout the crystallization processes,
b. the ability to use waste heat from the process to evaporate water,
c. the elimination or the substantial reduction of the consumption of fuel in the process to separate water from the iron sulfate,
d. significant savings in the cost of fuel, and significant improvements in the operation economy and commercial feasibility of recovering seaparately iron sulfate monohydrate and a residue containing recoverable valuable non-ferrous metals, and
e. the production of substantial quantities of hydrogen sulfide which can be used subsequently for the selective separation of the base metals present in the feed material and the surplus of which can lend itself to the economic recovery of elemental sulfur.

The invention further includes an improved selective leaching process for the production of high purity iron sulfate monohydrate from feed materials that contain partially soluble sulfides of metals like zinc and/or nickel, and an improved process for concentrating the valuable non-ferrous metal components of the feed, and for recovery of these components in a sulfide residue of high commercial value.

This invention includes novel crystallization and dehydration procedures for the separation of iron from the solution in form of iron sulfate monohydrate, and also includes a novel combination of such leaching and crystallization procedures to enable the use of the process waste heat from the leaching system for crystallization and dehydration of the iron sulfate product and recycle of the mother liquor from the crystallizer to the leaching system for cooling purposes and for dissolving iron sulfate crystals.

DETAILED DESCRIPTION

Figure 1:
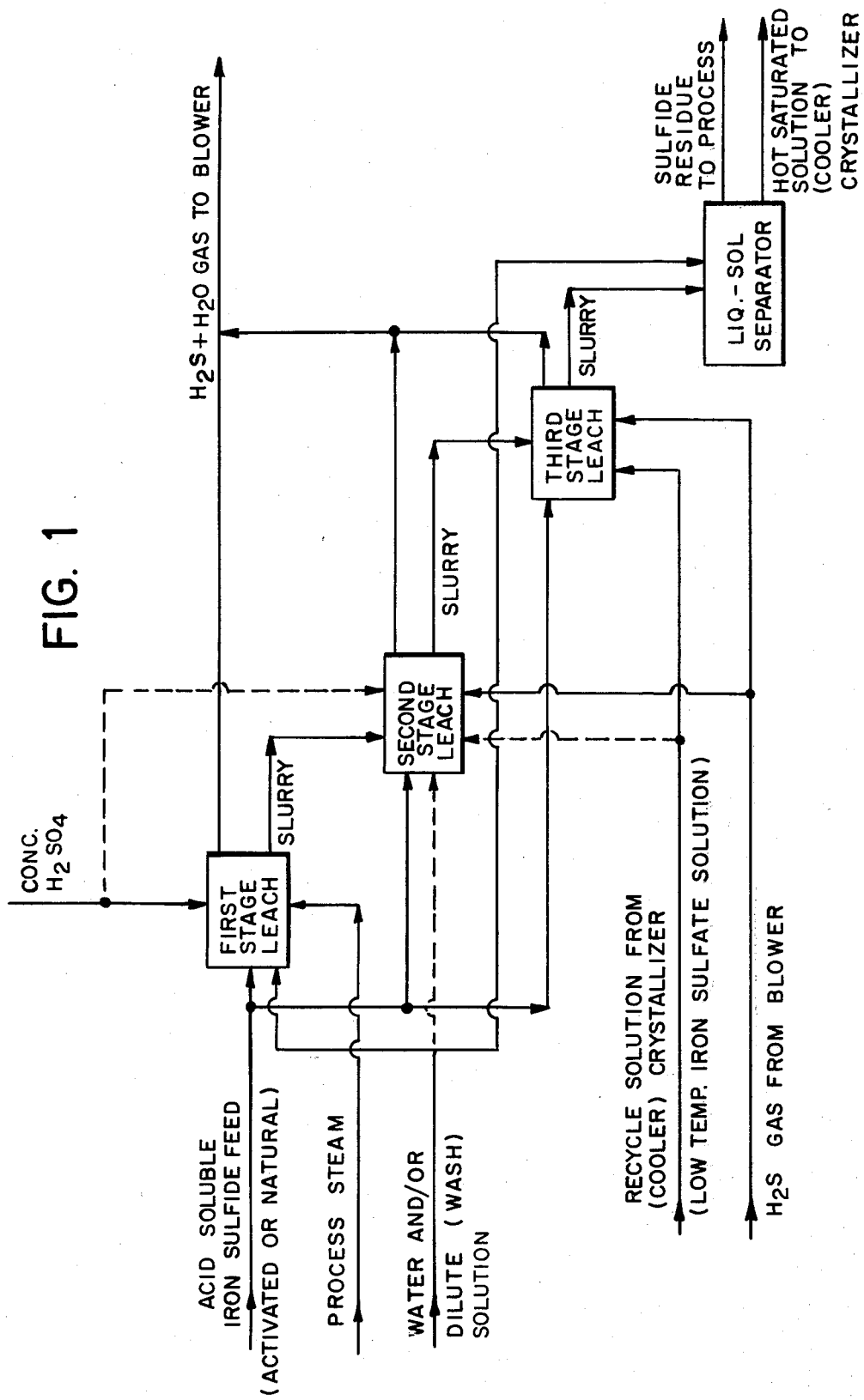
FIG. 1 is a flow diagram of a selective iron co-current leaching process in accordance with the invention.
Figure 2:
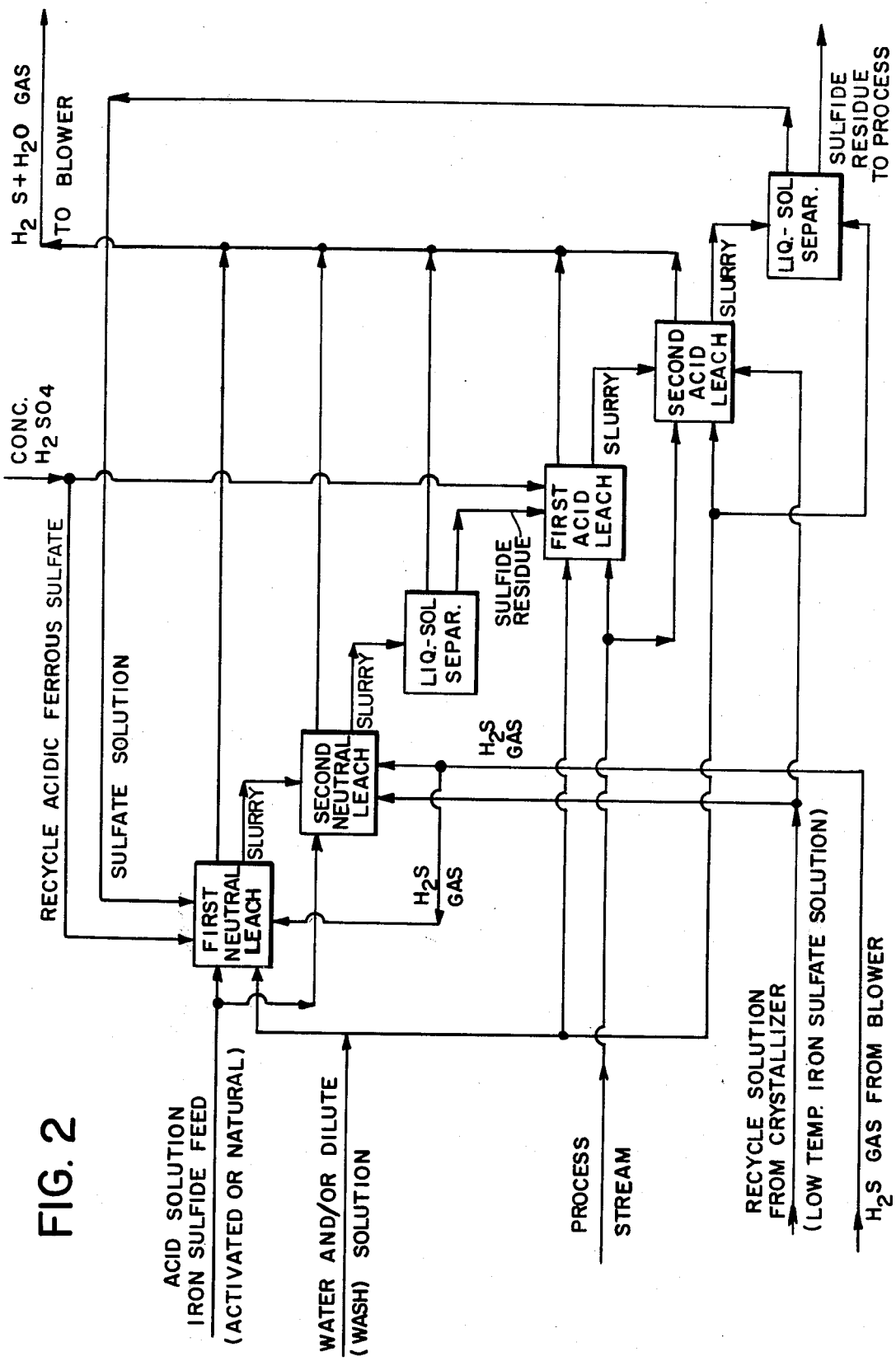
FIG. 2 is a flow diagram of a selective iron counter-current leaching process in accordance with this invention.
Figure 3:
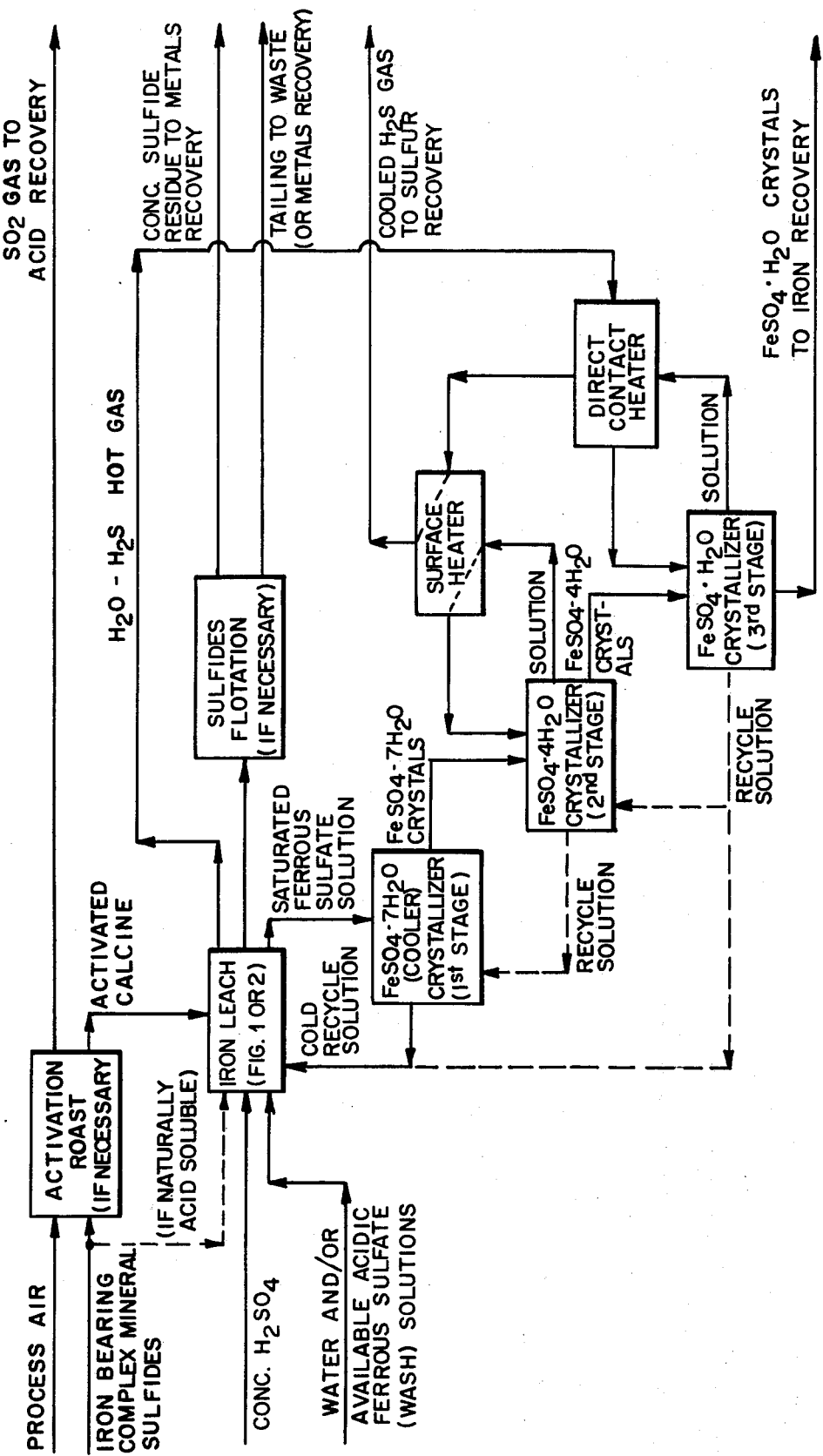
FIG. 3 is a flow diagram of a combined leaching and crystallizing process in accordance with this invention.

The almost saturated purified iron sulfate solution utilized in the process of this invention may be recovered from either the co-current or counter-current leach processes described in our parent application Ser. No. 133,553 filed Apr. 13, 1971, now U.S. Pat. No. 3,860,696. The solution is charged to a first stage (cooling) section of the crystallizer system as shown in FIG. 3.

In the first stage (cooling) section of the crystallizer system the feed solution now essentially saturated with iron sulfate at 50° to 80° C, and preferably at about 65° C is flash cooled to a temperature below about 50° C. and preferably in the range of 25° to 35° C. to precipitate crystals of $FeSO_4 \cdot 7H_2O$. It is advantageous to cool the solution to between about 10° to 30° C. to obtain an effective precipitation. As a result of cooling, a fraction of the iron sulfate is precipitated in the form of high purity crystals of $FeSO_4 \cdot 7H_2O$, or commercial copperas. The precipitation of the copperas may be accomplished in three stages as follows:

a. cooling the solution to temperatures below 50° C. and preferably below 35° C. to precipitate high purity crystals of copperas ($FeSO_4 \cdot 7H_2O$),
b. subjecting the solution to reduced pressure to evaporate and remove water, and to precipitate additional crystals of copperas,
c. reheating the solution to evaporate and remove additional water at reduced pressure, and to produce additional crystals of copperas, and
d. separating the crystals from the solution at temperatures below 50° C. and preferably below 35° C.

The crystals are separated from the mother liquor on screens, or other conventional equipment as a major product from this stage of the crystallizer system. The mother liquor, now cold and partially depleted in content or iron, is recycled either to the gas cleaning system and/or to the last stages of the co-current leach system or to the last stages of the neutral and/or acid leach circuits of the counter-current leach system, as a solvent for crystals of iron sulfate, an absorbent for waste heat, or a coolant for leach pulps or slurries as previously described.

Figure 4:
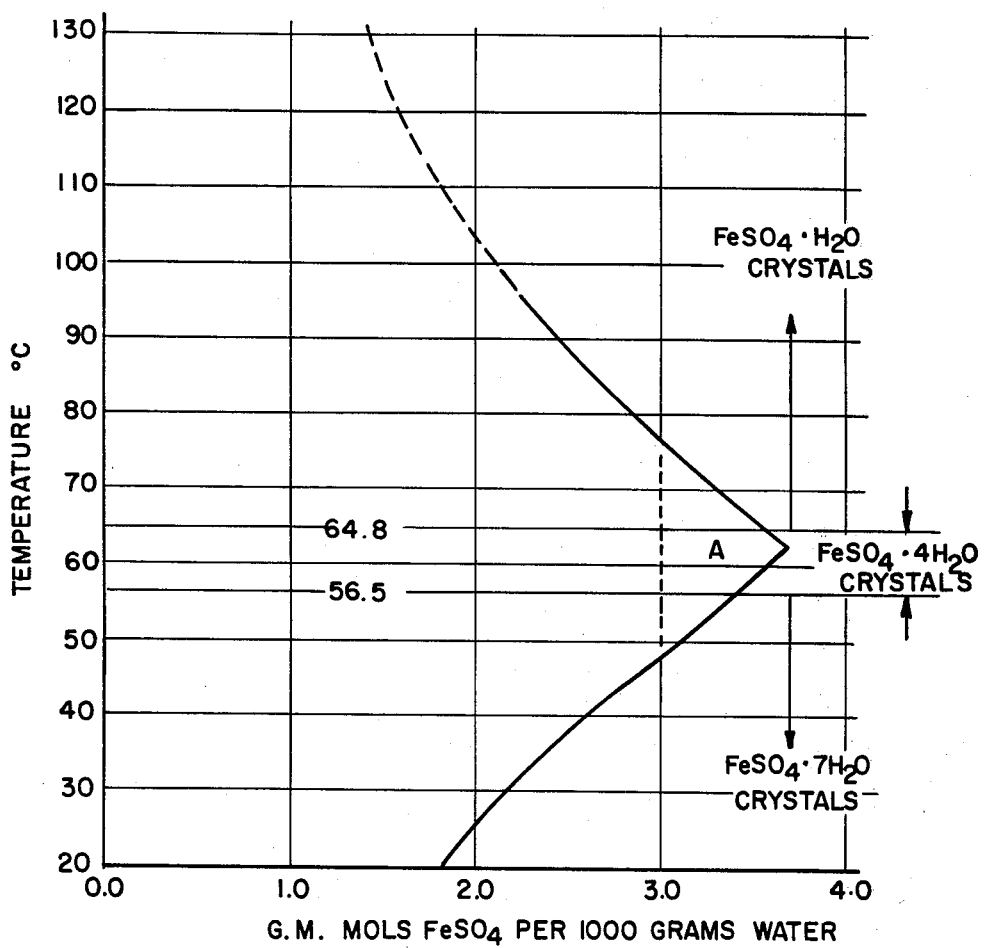
FIG. 4 is a graph showing the temperature and concentrations at which various forms of iron sulfate hydrates exist in equilibrium with their saturated solutions.

The cold oversize crystals of $FeSO_4 \cdot 7H_2O$ produced on the screens of the first stage crystallizer, as discussed above, are charged to a saturated solution of iron sulfate in the second stage vessels of the crystallizer system. The solution is heated with waste heat from the gases generated in the leach system, as described above. The temperature in this stage of the crystallizer is maintained between about 56.5° and 64.8° C., a range of temperatures in which the stable hydrate of iron sulfate is $FeSO_4 \cdot 4H_2O$ as indicated on FIG. 4. The iron sulfate is converted from $FeSO_4 \cdot 7H_2O$ in the feed, to $FeSO_4 \cdot 4H_2O$ in the product from this crystallizer system.

The existence of iron sulfate as $FeSO_4 \cdot 4H_2O$ as an exact hydrate has been questioned by some scientists. This iron sulfate hydrate probably exists as indefinite composition of a mixture of various iron sulfate hydrates averaging about $FeSO_4 \cdot 4H_2O$. The formula $FeSO_4 \cdot 4H_2O$ is used herein in this context.

Figure 3A:
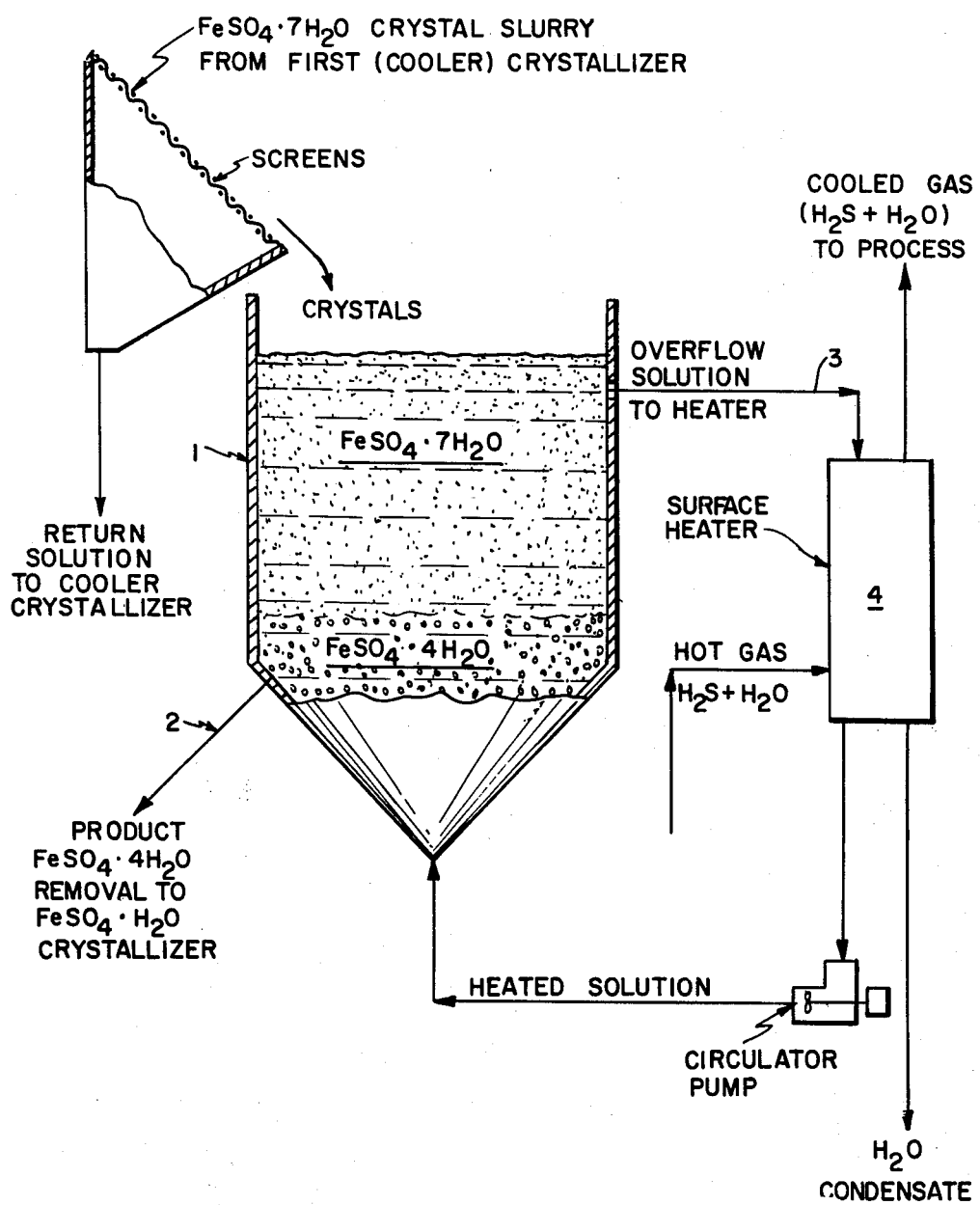
FIG. 3a is a schematic view of a crystallizer which can be used according to this invention.

FIG. 3a shows an example of equipment and a process for recovery of $FeSO_4 \cdot 7H_2O$ crystals and for the conversion thereof to $FeSO_4 \cdot 4H_2O$. The $FeSO_4 \cdot 7H_2O$ crystals are separated from the liquid on the screens as shown in FIG. 3a, causing the crystals to be deposited by gravity in the vessel 1 containing a saturated solution of iron sulfate maintained advantageously at a temperature between 56.5° and 64.8° C. They are gradually converted to the stable $FeSO_4 \cdot 4H_2O$ hydrated form and since these crystals are heavier than the 7 hydrated crystals they fall to the bottom of the vessel and can be removed through line 2 and discharged to the third stage crystallizer which can utilize process and equipment similar to that described above for the second stage crystallizer with the exception of the solution heater.

The saturated solution of iron sulfate is removed from the top of the vessel 1 through line 3, to the heater 4, which can be a direct contact heater but is advantageously a surface heater, and charged to the bottom of the vessel 1 through line 5 as shown in the drawing by means of a suitable pump to maintain the temperature in the vessel at between about 56.5° and 64.8° C.

The water generated from the above conversion of $FeSO_4 \cdot 7H_2O$ to $FeSO_4 \cdot 4H_2O$, accumulates in the form of an increasing supply of saturated solution in the second stage of this crystallization process. This excess solution may be either recycled to the first stage (cooling) crystallizer, or the excess water may be evaporated in the second stage of the crystallizer, and no excess solution produced.

In the combined leach and crystallization process of this invention, the waste heat available from the leach system generally will be sufficient both to dehydrate the $FeSO_4 \cdot 7H_2O$ to $FeSO_4 \cdot 4H_2O$, and to evaporate the excess water from the system. Consequently, evaporation rather than recycle, will be the preferred method for removal of the excess water from the system. The recycle method, however, will be used when waste heat is deficient.

The product crystals from the second stage of the crystallizer system ($FeSO_4 \cdot 4H_2O$) are separated from the solution, at temperatures between 45° and 65° C on conventional equipment such as screens, and are repulped in a solution saturated with iron sulfate, at temperatures above 65° C., in the manner described above for conversion of $FeSO_4 \cdot 7H_2O$ to $FeSO_4 \cdot 4H_2O$. The resulting slurry is heated to temperatures above 65° C., and advantageously in the range of 75° to 90° C., in direct contact with hot gasses containing water vapor. At temperatures above 65° C., the stable hydrated iron sulfate is $FeSO_4 \cdot H_2O$, and the $FeSO_4 \cdot 4H_2O$ in the feed slurry to this section of the crystallizer is converted to $FeSO_4 \cdot H_2O$ in the third stage crystallizer. The $FeSO_4 \cdot H_2O$ being heavier settles to the bottom and can readily be recovered as a major product of the invention in the same manner as the $FeSO_4 \cdot 4H_2O$ is recovered. Solution heater 5 is a direct contact heater in which the solution is heated in direct contact with hot gases. When heating the iron sulfate solution to a temperature above 65° C. a direct contact heater must be used from a practical and economical standpoint. The monohydrate crystals can then be dewatered by centrifuge, for example, and recovered.

In the combined process of this invention, the above slurry of $FeSO_4 \cdot 4H_2O$ in a saturated solution of $FeSO_4$ is contacted with hot gases generated in the process and heated to temperatures above 65° C. with waste heat generated in the leach section and/or in other sections of the process. Furthermore, the combined process of this invention generally will provide sufficient waste heat to evaporate all water that is produced in conversion of $FeSO_4 \cdot 4H_2O$ to produce monohydrate ($FeSO_4 \cdot H_2O$) as the major product of the combined process.

EXAMPLE I

Co-current Leach

This example utilizes a co-current leach procedure that can be carried out illustrating both the selective extraction of iron and concentration of the non-ferrous metals from a sulfide mineral calcine that contains pyrite as a major component, and sulfide minerals of zinc, lead, and copper as minor components.

The original concentrate of sulfide minerals is roasted to remove a fraction of the sulfur content and to render the residual iron sulfide reactive with sulfuric acid to generate $H_2S$ gas and iron sulfate. The assay and composition of the calcine feed to this leach is approximately as follows:

| Component | Wt.% | Grams | Gm. Mols |
|---|---|---|---|
| Fe | 49.40 | 494.0 | 8.850 |
| S | 27.70 | 277.0 | 8.650 |
| Cu | 0.68 | 6.8 | 0.107 |
| Pb | 1.74 | 17.4 | 0.057 |
| Zn | 3.10 | 31.0 | 0.474 |
| Other | 17.38 | 173.8 | — |
| Total | 100.00 | 1000.0 | |

Approximately 850 grams of the above calcine are mixed with about 500 grams of wash solution to produce a high density pulp in closed vessel leach equipment that simulates the first stage of the selective co-current leach process of the invention. The entire charge, approximately 760 grams of concentrated sulfuric acid are mixed and allowed to react with the above slurry for a period of 1 hour. During the entire period of the leach reactions, streams of both additional wash solutions and $H_2S$ gas are injected to control both the density and the circulation of the pulp within the leach vessel.

The temperature of the pulp during the first stage high density leach described above, can be varied between 95° and 105° C, and the composition of the product slurry at 95° C. is approximately as follows:

| Component | Wt.% | Grams | Gm. Mols |
|---|---|---|---|
| Unreacted Solids | | 285 | — |
| Crystals ($FeSO_4 \cdot H_2O$) | | 935 | 5.5 |
| Total Solids | 35. | 1120 | |
| Soluble $FeSO_4$ | | 520 | 3.4 |
| $H_2SO_4$ | | 110 | 1.1 |
| $H_2O$ | | 1620 | 90.0 |
| Total Liquids | 65. | 2250 | |
| Total Slurry | 100. | 3470 | |

The above slurry is diluted and cooled to about 80° C with additional wash solution, and an additional 100 gram fraction of the calcine mineral feed is mixed with the diluted slurry in the second stage of the co-current leach process of this invention.

The new slurry is agitated by a stream of $H_2S$ gas injected at the bottom of the leach vessel, and allowed to react for approximately 1 hour at a temperature of 80° to 85° C. The composition of the reacted slurry from the second stage of the leach is approximately as follows:

| Component | Wt.% | Grams | Gm. Mols |
|---|---|---|---|
| Unreacted Solids | | 305 | — |
| Crystals ($FeSO_4 \cdot H_2O$) | | 750 | 4.4 |
| Total Solids | 27.2 | 1055 | |
| Soluble $FeSO_4$ | | 840 | 5.5 |
| $H_2SO_4$ | | 10. | 0.1 |
| $H_2O$ | | 1980 | 110.0 |
| Total Liquid | 72.8 | 2830 | |
| Total Slurry | 100.0 | 3885 | |

The above product slurry from the second stage is diluted and cooled to about 65° C with a solution of $FeSO_4$ from the recycle from the cooler stage of the crystallization process of this invention. The remaining 50 gram fraction of the calcine mineral feed is mixed with this diluted slurry in the third stage of the co-current leach process of this invention. This new slurry is agitated by a stream of $H_2S$ gas injected at the bottom of the leach vessel, and allowed to react for approximately one hour at a temperature of 60°-65° C. At the end of this leach the pH of the solution is about 1.8, and the composition of the slurry is approximately as follows:

| Component | Wt.% | Grams | Gm. Mols |
|---|---|---|---|
| Unreacted Solids | | 320 | — |
| Crystals | | None | |
| Total Solids | 3.7 | 320 | |
| $FeSO_4$ from Calcine | | 1180 | 7.78 |
| $FeSO_4$ from Recycles | | 1560 | 10.22 |
| $FeSO_4$ Total | | 2740 | 19.00 |
| Zn in Solution | Trace* | Trace* | Trace* |
| $H_2O$ | | 5660 | 314.0 |
| Total Solution | 96.3 | 8400 | |
| Total Slurry | 100.0 | 8720 | |

$$\frac{\text{Wt. of Soluble Fe}}{\text{Wt. of Soluble Zn}} = \pm 3600$$

The above slurry is filtered at about 60° C, the residue is washed with water, and both the residue and filtrate are accumulated as products of the co-current leach process of this invention. The composition of the washed residue is approximately as follows:

| Component | Wt.% | Grams | Gm. Mols |
|---|---|---|---|
| Fe | 18.7 | 60.0 | 1.070 |
| S | 17.2 | 55.0 | 1.708 |
| Cu | 2.1 | 6.8 | 0.107 |
| Pb | 5.4 | 17.4 | 0.084 |
| Zn | 9.7 | 31.0 | 0.474 |
| Balance | 46.9 | 149.8 | — |
| Total | 100.0 | 320.0 | |
| Assumed Mineral Composition: | | | |
| FeS | 29.4 | 94.2 | 1.070 |
| CuS | 3.2 | 10.2 | 0.107 |
| PbS | 6.3 | 20.2 | 0.084 |
| ZnS | 14.5 | 46.3 | 0.474 |
| Insol. | 46.6 | 149.1 | |
| Total | 100.0 | 320.0 | |

EXAMPLE II

Crystallization and Dehydration of $FeSO_4$

The purified leach solution from Example I, which is available at about 60° C, is cooled to about 30° C. by the (flash) evaporation of water at reduced pressure, in the cooling stage of the crystallization and dehydration process of this invention. As a result of both the evaporation of water from the solution, and the reduced solubility of $FeSO_4$ at the lower temperature, crystals of $FeSO_4 \cdot 7H_2O$ (copperas) are precipitated and a slurry is obtained of the following approximate composition at 30° C.:

| Component | Wt.% | Grams | Gm. Mols |
|---|---|---|---|
| Crystals ($FeSO_4 \cdot 7H_2O$) | 31.2 | 2500 | 9.0 |
| Soluble $FeSO_4$ | — | 1360 | 9.0 |
| $H_2O$ | — | 4170 | 226.0 |
| Total Solution | 68.8 | 5530 | |
| Total Slurry | 100.0 | 8030 | |
| Crystals from Calcine | 77.2 | 1930 | 7.8 |
| Crystals from Import Solutions | 22.8 | 570 | 1.22 |
| Crystals Total (Above) | 100.0 | 2500 | 9.00 |

The above slurry is processed on screens at 30° C to separate the crystals, and the solution is accumulated for recycle to the third stage of the leach process of this invention, as described in Example I. The cold crystals of $FeSO_4.7H_2O$ are repulped in a solution that is essentially saturated with $FeSO_4$ at ±60° C, and this solution is heated to about 60° C by the transfer of heat through the walls of the equipment in the second stage of the crystallization process. As a result of the higher temperature, the crystals of $FeSO_4.7H_2O$ are converted to crystals of $FeSO_4.4H_2O$ in a slurry of the following approximate composition at 60° to 65° C.:

| Component | Wt.% | Grams | Gm. Mols |
|---|---|---|---|
| Crystals ($FeSO_4 . 4H_2O$) | 25.8 | 2080 | 9.0 |
| Soluble ($FeSO_4$) | | 2050 | 13.5 |
| $H_2O$ | | 3950 | |
| Total Solution* | 74.2 | 6000 | |
| Total Slurry | 100.0 | 8080 | |

*This solution is maintained at constant volume by the evaporation (at reduced pressure) of water in quantities equivalent to the production of water in the conversion of $FeSO_4 \cdot 7H_2O$ to $FeSO_4 \cdot 4H_2O$ by the preferred procedures of the process of this invention.

The above product slurry from the second stage of this crystallizer process is subjected to a conventional liquid-solid separation procedure at 60° C, and the solution is recycled to the repulp procedure of the second stage of the process. The crystals of $FeSO_4.4H_2O$ at about 60° C are repulped in a solution recycled from the third stage of the process and saturated with $FeSO_4$ at about 80° C, the resulting slurry is contacted with hot gases containing water vapor in the third stage of the crystallizer process of this invention. As a result of the above contacting, the slurry is heated to about 80° C, the crystals of $FeSO_4.4H_2O$ are converted to crystals of $FeSO_4.H_2O$, and water is evaporated from the slurry equivalent in quantity to the production of water in conversion of the $FeSO_4.4H_2O$ to $FeSO_4.H_2O$. The composition of the product slurry from the third stage of this crystallizer process at the temperature of about 80° C is approximately as follows:

| Component | Wt.% | Grams | Gm. Mols |
|---|---|---|---|
| Crystals ($FeSO_4 . H_2O$) | 24.2 | 1530 | 9.0 |
| Soluble $FeSO_4$ | | 1550 | 10.2 |
| $H_2O$ | | 3250 | |
| Total Solution | 75.8 | 4800 | |
| Total Slurry | 100.0 | 6330 | |

The above product slurry from the third stage of this crystallizer process is subjected to a conventional liquid-solid separation procedure, and the solution is recycled to the repulp procedure of this stage of the process.

The monohydrate product crystals ($FeSO_4.H_2O$) from this stage of the process, are accumulated as the major product of the crystallization and dehydration process of this invention.

We claim:

1. The process for producing high purity crystals of ferrous sulfate monohydrate from a purified solution that is essentially saturated with ferrous sulfate at temperatures of 50° to 80° C. which comprises the steps of:
   a. cooling the solution to a temperature below about 50° C. to precipitate crystals of ferrous sulfate heptahydrate,
   b. separating the crystals of ferrous sulfate heptahydrate from the solution at a temperature below about 50° C.,
   c. pulping the crystals of ferrous sulfate heptahydrate in a hot purified aqueous solution that is essentially saturated with ferrous sulfate to produce a high density slurry of crystals,
   d. heating the slurry of crystals to a temperature of from about 56.5° to about 64.8° C to dehydrate a fraction of the crystals from $FeSO_4.7H_2O$ to $FeSO_4.4H_2O$,
   e. separating the crystals of $FeSO_4.4H_2O$ from the slurry,
   f. pulping the crystals of $FeSO_4.4H_2O$ in a hot purified aqueous solution that is essentially saturated with ferrous sulfate to produce a second high density slurry of crystals,
   g. heating the second slurry with hot gases to a temperature above 65° C. to evaporate the water and to produce dry solids that are essentially pure crystals of ferrous sulfate monohydrate, and
   h. collecting the crystals of ferrous sulfate monohydrate as product of the process.

2. The process of claim 1 wherein the solution of ferrous sulfate is flash cooled in step (a) to a temperature of from about 25° to about 35° C. and the crystals of ferrous sulfate heptahydrate are separated in step (b) at this temperature.

3. The process of claim 1 wherein the second slurry is heated in step (g) to a temperature of from about 75° to about 90° C.

4. The process of claim 1 in which the solution is initially at a temperature of about 65° C.

5. The process of claim 1 wherein the solution obtained in step (b), after separation of the crystals of ferrous sulfate heptahydrate, is
   i. subjected to a reduced pressure to evaporate and remove water, and to precipitate additional high purity crystals of ferrous sulfate heptahydrate,
   ii. heated to evaporate and remove additional water at reduced pressure and to produce further high purity crystals of ferrous sulfate heptahydrate, and
   iii. the crystals formed in steps (i) and (ii) are separated from the solution at temperatures below about 50° C and combined with the crystals obtained in step (b).

6. The process of claim 5 in which the crystals containing $FeSO_4.4H_2O$ are separated from the slurry at temperatures between 45° and 65° C., repulped in a saturated solution of ferrous sulfate to produce a second high density slurry, and this slurry is contacted with hot gases to evaporate the water and to produce dry crystals of $FeSO_4.H_2O$ at temperatures about 65° C., which are collected as product of the process.

* * * * *